O. A. BOEHM.
VACUUM INSULATED BOTTLE.
APPLICATION FILED DEC. 15, 1908.
924,138.
Patented June 8, 1909.
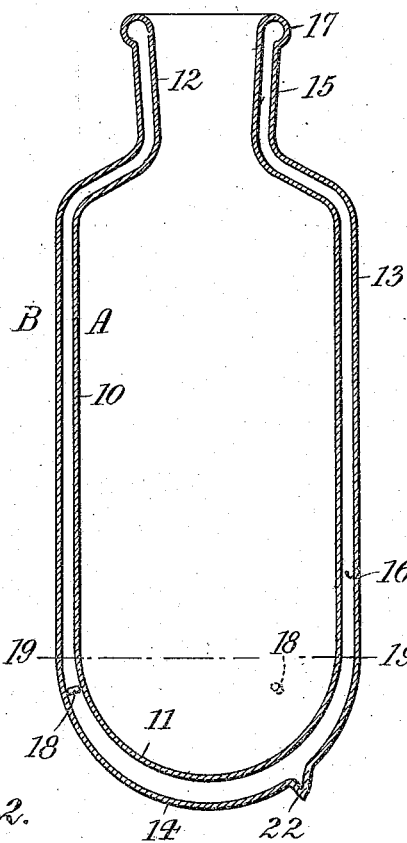
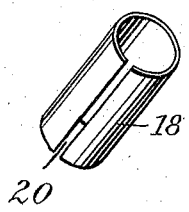
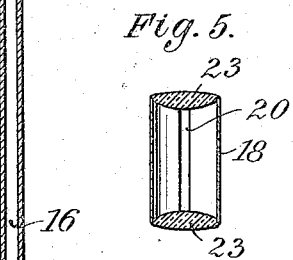
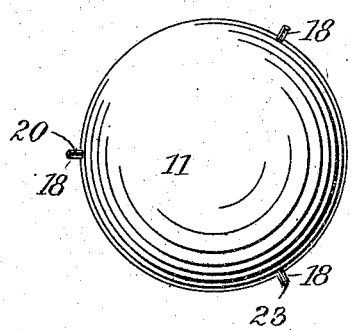
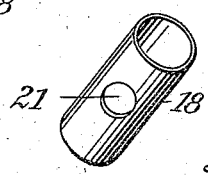
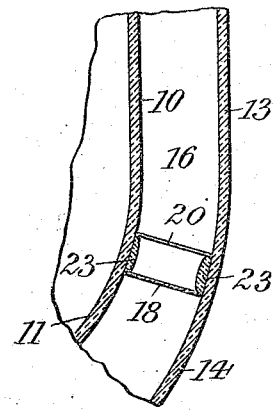
Witnesses:
W. R. Schulz
Edward Dehorr.
Inventor
Oscar A. Boehm
By his Attorney Arthur E. Gumps

UNITED STATES PATENT OFFICE.

OSCAR A. BOEHM, OF NEW YORK, N. Y.

VACUUM-INSULATED BOTTLE.

No. 924,138.　　　Specification of Letters Patent.　　　Patented June 8, 1909.

Application filed December 15, 1908. Serial No. 467,626.

*To all whom it may concern:*

Be it known that I, OSCAR A. BOEHM, citizen of the United States, and resident of New York city, in the county of New York and State of New York, have invented certain new and useful Improvements in Vacuum-Insulated Bottles, of which the following is a specification.

This invention relates to vacuum insulated, double-walled bottles for preserving hot and cold liquids or other substances.

The invention relates more particularly to novel and effective means for sustaining the inner vessel properly centered within the outer vessel, so that any liability of the inner vessel breaking at its neck, is prevented.

In the accompanying drawing: Figure 1 is a vertical longitudinal section through a bottle embodying my invention; Fig. 2 a bottom view of the inner vessel showing it provided with a number of sustaining tubes; Fig. 3 an enlarged section through part of the bottle showing one of the tubes in position; Fig. 4 a perspective view of a sustaining tube; Fig. 5 a longitudinal section thereof showing the ends of the tube sealed, and Fig. 6 a perspective view of a modification of the tube.

The inner vessel A of my improved vacuum insulated bottle is composed of a cylindrical section or wall 10, a substantially semi-globular lower section or bottom 11, and a contracted neck 12. Vessel A is inclosed within an outer vessel B, the shape of which corresponds, substantially, to that of vessel A, vessel B being provided with a cylindrical section 13, a curved bottom 14, and a neck 15. Vessels A and B are preferably made of glass, and their relative sizes are such that a narrow chamber 16 is formed between them. The necks 12 and 15 of vessels A and B respectively, are fused or molten together, whereby an annular bead 17 is formed, as clearly shown in Fig. 1.

Means must be provided for sustaining the inner vessel A properly centered within outer vessel B, so that all undesirable lateral movements of the former within the latter are prevented, even when a filled bottle is placed sidewise or receives heavy shocks, as otherwise there is considerable liability of the bottle cracking at its neck. These sustaining means should preferably support the lower part of the inner vessel, as said part is subjected to the greatest deviation from the axis of the bottle. The means hereinabove referred to are shown to consist of a number of tubular metallic stays 18, which are so interposed between the walls of the inner and outer vessels that the axis of each stay extends at a substantially right angle to the wall sections which it connects. The drawing shows three evenly distributed stays or tubes 18, which are located slightly below the zone 19 constituting the junction between the cylindrical and semi-globular sections of the vessels. Tubes 18 are provided with a lateral aperture which may either be made in the form of a longitudinal slot 20, (Fig. 4), or in the form of a perforation 21, (Fig. 6). It is obvious that said opening may be of any other convenient shape or size, the object thereof being to permit an evacuation of the interior of the tube, when chamber 16 is exhausted. For evacuating the latter, vessel B is provided with a teat 22, which is sealed after the air has been exhausted from the chamber.

In manufacturing my improved bottle, the inner vessel is first completed, whereupon the tubes 18 are fused thereto at the desired points by properly heating vessel and tubes. In order to facilitate this operation, the open ends of each tube 18 have previously been sealed by small plugs 23 of molten glass, said plugs projecting preferably slightly beyond the edges of the tube. When vessel A and glass-sealed tubes 18 are brought into contact while being properly heated, they will thus readily bind. After vessel A has been provided with say three tubes 18, (Fig. 2), it is inserted into outer vessel B, and necks 12 and 15 are fused together. The outer vessel, while being heated at its lower end, is then drawn inward to form curved bottom 14. During the last stage of this operation, the heated bottom 14 will contact with the outer ends of tubes 18 to become fused thereto. Chamber 16 is finally evacuated and teat 22 is sealed.

Although a substantially cylindrical bottle is shown in the drawing, it is obvious that the bottle may be made of any other desired shape, and it is further obvious that the shape and relative size of the sustaining tubes may be varied, without departing from the spirit of my invention.

It will be seen that by my improved construction, the inner vessel is maintained properly centered within the outer vessel by means of comparatively small metal tubes which notwithstanding their lightness, offer great resistance in axial direction. In this way great strength is obtained with a minimum expenditure of metal, which saving of material is very important as the tubes are preferably made of platinum. It will further be seen that neither the inner nor the outer vessel is provided with any projection, indentation or other objectionable unevenness for holding the sustaining means in position, so that a smooth bottle of superior durability is obtained.

I claim:

1. A vacuum insulated bottle comprising a pair of vessels having a vacuum space therebetween, and an apertured metallic tube interposed between said vessels and fused thereto.

2. A vacuum insulated bottle comprising a pair of vessels having a vacuum space therebetween, and a plurality of apertured metallic tubes interposed between said vessels and fused thereto.

3. A vacuum insulated bottle comprising a pair of vessels having a vacuum space therebetween, a plurality of apertured metallic tubes in said space, and a glass plug at each end of each tube, said plugs being fused to the vessels.

4. A vacuum insulated bottle comprising an inner vessel having a cylindrical section and a curved bottom, an outer vessel having a cylindrical section and a curved bottom, a plurality of apertured metallic tubes interposed between the vessels slightly below the junction between the cylindrical sections and bottoms, and a glass plug at each end of each tube, said plugs being fused to the vessels.

Signed at New York city in the county of New York and State of New York.

OSCAR A. BOEHM.

Witnesses:
A. J. KELLEY,
ARTHUR E. ZUMPE.